Feb. 11, 1936.  G. F. THOMA  2,030,233
FREEZING APPARATUS
Filed May 19, 1933   2 Sheets-Sheet 1
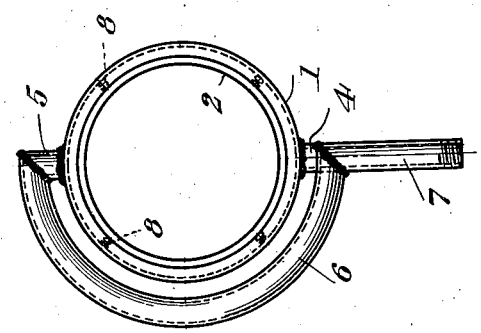
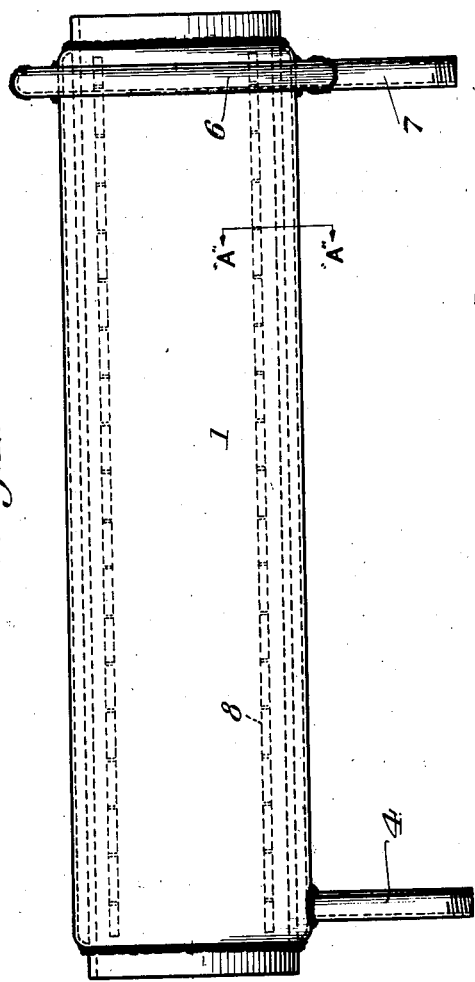
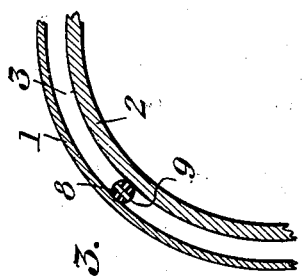
INVENTOR.
Gerald F. Thoma
BY
Victor J. Evans & Co. ATTORNEYS.

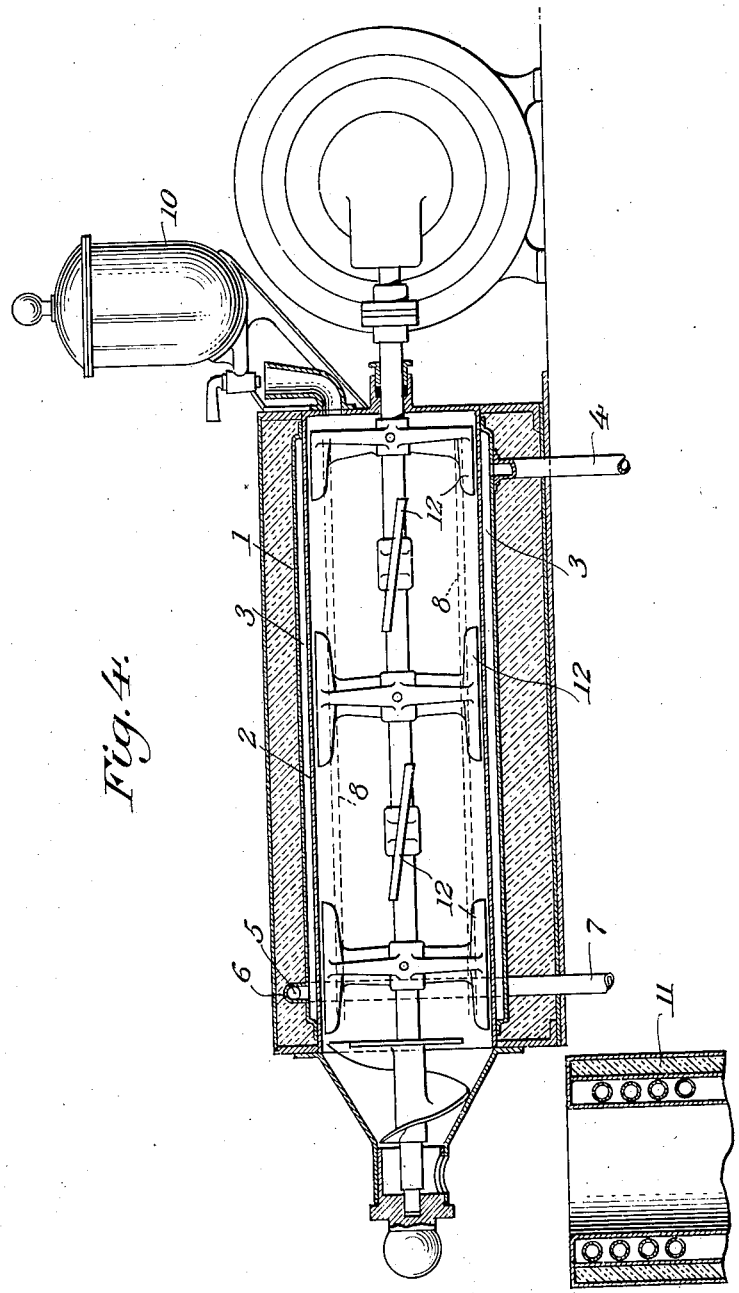

Patented Feb. 11, 1936

2,030,233

UNITED STATES PATENT OFFICE 2,030,233

FREEZING APPARATUS

Gerald F. Thoma, Canton, Ohio

Application May 19, 1933, Serial No. 671,910

1 Claim. (Cl. 62—114)

This invention relates to apparatus for freezing ice cream, custards and similar food materials and has for its object the provision of a simple and inexpensive apparatus by the use of which the material may be very quickly and evenly frozen or congealed.

The invention is illustrated in the accompanying drawings and will be hereinafter fully set forth and defined.

In the accompanying drawings:—

Figure 1 is a side elevation of an apparatus embodying the invention.

Figure 2 is an end elevation of the same.

Figure 3 is an enlarged detail section on the line A—A of Figure 1.

Figure 4 is a longitudinal sectional view of the device in applied position.

In carrying out the invention, there is provided a cylindrical casing consisting of an outer cylinder 1 and an inner cylinder 2 which may be constructed of any suitable or preferred material. The cylinders are, of course, arranged concentrically providing an intervening space 3 within which a refrigerating agent is caused to circulate, the space being closed at its ends in any convenient manner which will effectually prevent leakage and loss of the refrigerating or freezing agent. The inner cylinder is open at its ends and is to be connected at one end with any suitable hopper 10 or other device for supplying the material which is to be frozen to the interior of the cylinder, while at the opposite end it is arranged over a suitable receptacle 11 into which the frozen material will be discharged. Near the end into which the material is delivered and on its under side the casing is provided with an inlet pipe 4 which communicates with the space 3 between the two cylinders and is to be connected with any preferred type of refrigerating apparatus. At the opposite end of the casing and on its upper side there is connected an outlet pipe 5 which communicates directly with an arcuate section 6 leading to a return pipe 7 which is connected with the return side of the refrigerating apparatus, the arcuate section 6 passing around the casing, as shown in Figure 2, preferably in spaced relation thereto. At intervals I secure between the two cylinders distributor bars 8 which may be of any preferred material and have diametrical perforations 9 therethrough which are so disposed as to permit flow of a refrigerating agent through the bars from one side thereof to the opposite side. In Figure 2 these distributor bars are indicated as being spaced about the casing at intervals of 90 degrees and disposed at intervals of 45 degrees from the inlet and the outlet at the opposite sides thereof. It will be understood, however, that the bars may be provided in a greater number or a less number if desired and, while Figure 1 indicates the bars as extending in continuous lengths from end to end of the casing, they may be disposed in shorter lengths and variously arranged without affecting the efficiency of the machine.

In use the mixture which is to be frozen is fed into the receiving end of the casing by pressure means 12 which will force it through the entire length of the casing and discharge it at the opposite end, the means for feeding the material and forcing it through the casing and for receiving it after discharge not being illustrated in the drawings as in themselves they form no part of the invention and they may be of any known or approved type. The inlet 4 and the outlet 7 are connected to opposite sides of a refrigerating system, as has been stated, and a refrigerating agent is thereby caused to circulate through the inlet pipe 4 and the space between the cylinders. The distributing bars 8 serve to interrupt the direct flow of the refrigerating agent from the inlet to the outlet so that it will be retarded and forced to travel around the entire circumference of the inner casing and thereby act on the entire body of the material being passed therethrough so that the refrigerant will not collect at one side of the casing and act upon only a portion of the material but will be forced to spread over the entire surface of the inner cylinder and act upon the entire body of the material. The result of using this machine will be that the ice cream or other material will be evenly congealed throughout and, therefore, will prove satisfying to persons partaking thereof. The machine is exceedingly simple and may be produced and maintained at a very low cost. There are no moving parts to break or get out of order and the apparatus may be used for a long period without any necessity for repairs or renewals.

Having described the invention, I claim:

A freezing apparatus comprising a casing having spaced concentrically arranged inner and outer cylinders, the inner cylinder being of greater length than the outer cylinder and open at opposite ends, the outer cylinder at its ends being rendered closed against the inner cylinder, rod-like bars extending longitudinally of and between the cylinders and arranged equally distant from each other and having spaced perforations to allow flow of fluid circumferentially between said cylinders, a pipe opening through the outer cylinder into the space between said cylinders and close to one end of said outer cylinder, and a pipe half-encircling the outer cylinder near its other end and communicating with the space between said cylinders at diametrically opposite points thereof.

GERALD F. THOMA.